United States Patent Office 3,437,884
Patented Apr. 8, 1969

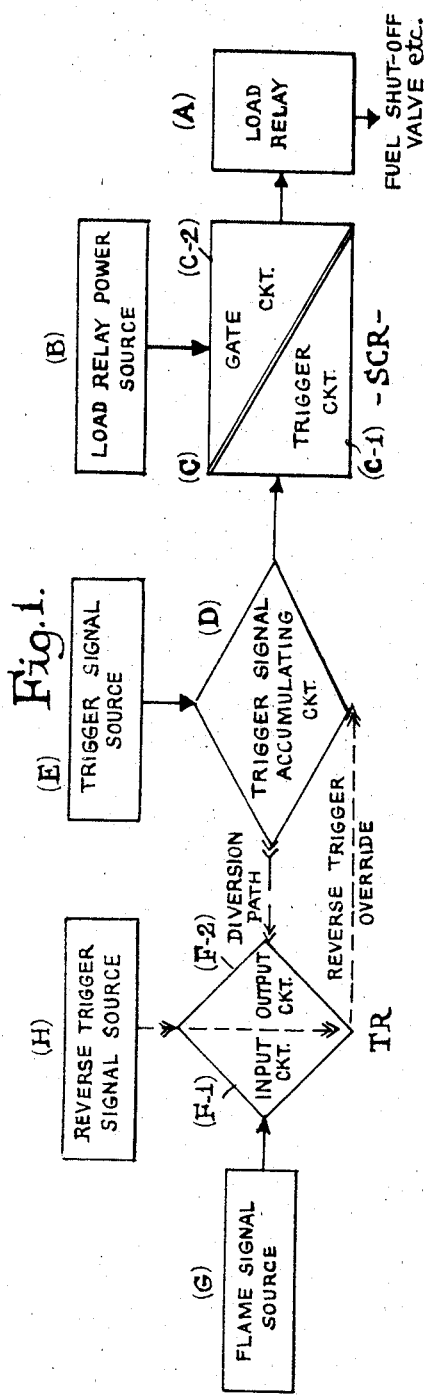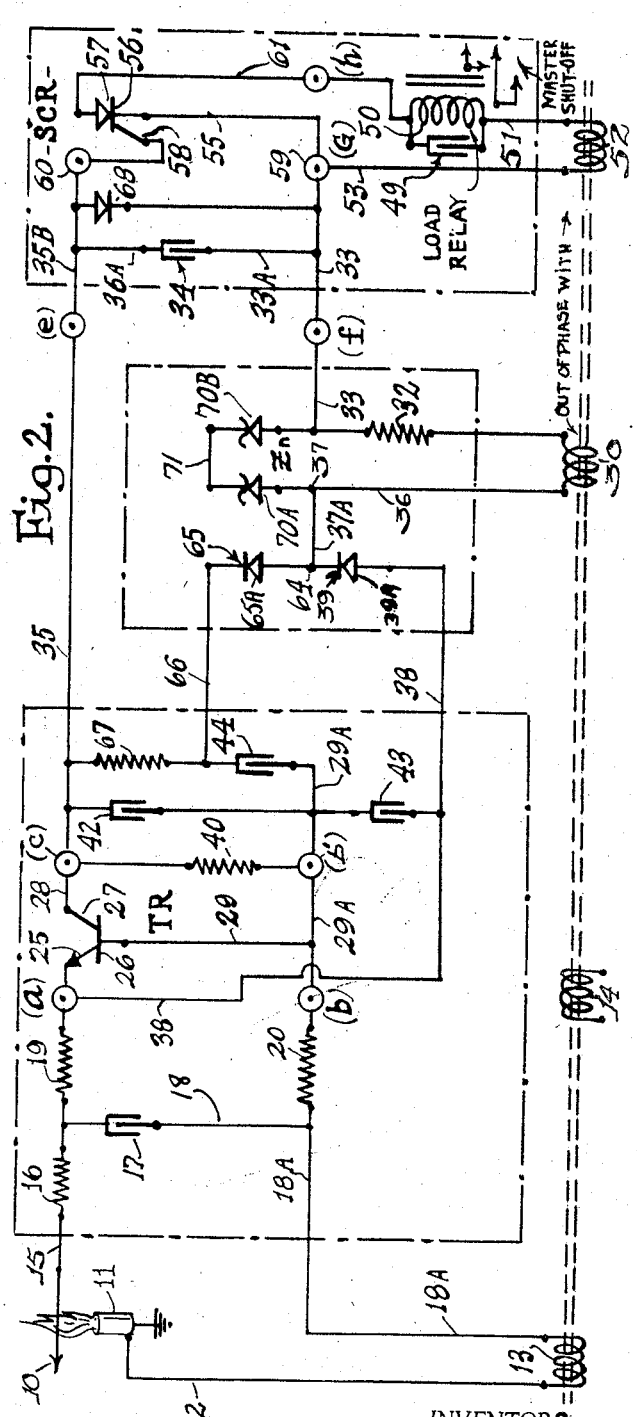

3,437,884
FLAME MONITORING CIRCUIT
Richard F. Mandock, Schiller Park, and Ronald F. Plambeck, Chicago, Ill., assignors to Protection Controls, Inc., Skokie, Ill., a corporation of Illinois
Filed Nov. 21, 1966, Ser. No. 595,976
Int. Cl. H01h 47/32; G08b 21/00
U.S. Cl. 317—148.5        11 Claims

ABSTRACT OF THE DISCLOSURE

A flame monitoring apparatus having a silicon controlled rectifier supplied with a continual triggering voltage from a triggering circuit to hold a load relay normally in sustained operation so long as the monitored flame is present. A transistor, which is normally biased in an off condition by the presence of the monitored flamed, is rendered conductive as a result of cessation of the flame and provides a diversionary path for the triggering circuit so that no triggering voltage is supplied to the silicon controlled rectifier thereby causing the silicon controlled rectifier to become nonconductive and thus deenergize the load relay.

---

This invention provides improvements in flame monitoring apparatus of the type utilizing flame-passed or rectified current as the primary source of signal energy governing the operation of a master load relay adapted to actuate a fuel shut-off valve, and such other optional alarm and indicting means as may be desired to identify the failed burner unit.

The system is characterized, among other features of novelty and utility, by the simplicity and compactness of the individual monitoring units which may be of plug-in module character frequently smaller than the load relays which they control; by dependable sensitivity to flame signal currents as low as 2 microamperes; by the ability of the individual monitoring units to control directly, without intermediate relay means, the relative high working currents in the ¼- to 2-ampere and higher ranges suitable to energization of the usual load relay, which itself directly controls the fuel valves and associated supervisory equipment; by fail-safe operation in respect to the circuit components and over-all performance of the apparatus; by circuitry which permits the use in the flame-responsive parts of the circuit of transistors (which are otherwise objectionably heat-sensitive) so that the monitor units may be located close to the monitored burner in order to keep the flame signal leads as short as possible and reduce capacity and transient disturbances without impairment of the dependability of the flame-responsive functions of the circuit.

Regarded in some of its more detailed functional aspects, the monitoring system employs solid-state electron-flow devices which are responsive to biasing and triggering voltages in conjunction with circuitry wherein a continual triggering voltage is supplied to a gating device to hold a load relay normally in sustained operation so long as the monitored flame continues, wherein a diversion circuit is operative to divert the triggering voltage and stop gating of power to the load relay in response to flame failure so that the relay drops out; and wherein, as an added safeguard in disabling the triggering circuit for the gating device, an over-ride voltage of reversed, nontriggering polarity is applied to the trigger circuit for the gating device to exclude the possibility of further triggering by marginal or residual triggering energy whatever its source.

Thus, a load relay is held in by rapid pulsing from a repetitiously triggered gate circuit by trigger pulses from an accumulating circuit which can be disabled, however, by a diverting circuit rendered effective when the flame fails; and when this occurs, the accumulating circuit may be further disabled against triggering action by application of a reversely poled triggering pulse thereto.

The foregoing and other objects and aspects of novelty distinguishing the disclosed monitoring apparatus are more fully described hereafter in view of the annexed drawing in which:

FIGURE 1 is a functional block diagram; and
FIGURE 2 is a circuit diagram.

Referring to FIGURE 1, the operation of the apparatus is illustrated beginning with the normal condition of the load relay A which is energized from its power source B through the gate circuit C-2 of the triggerable gating device SCR (silicon controlled rectifier) triggered to its conductive state by triggering signal energy from a trigger signal accumulating circuit D to which positive gating or triggering current is constantly supplied from the source E via the SCR trigger circuit C-1 so long as the flame continues.

A diversionary path for the triggering energy from accumulator means D is provided via the output circuit F-2 of an electron-flow device or transistor TR when the latter is rendered conductive as the result of cessation of the flame, this being the consequence of an absence of flame signal energy from source G which otherwise normally biases the transistor input circuit F-1 in a way to render the output circuit thereof nonconductive, thereby closing off the diversion path.

Thus, when the flame fails, the transistor becomes conductive and the trigger signal energy from accumulating means D is discharged through the output circuit F-2 thereof and is rendered unavailable to fire or trigger the SCR, in consequence of which the load relay drops out to the failed or alarm condition to shut off the fuel supply and actuate such other equipment as may be required.

Accidental triggering of the gating device following a failure, which might be caused by the existence of residual, spurious or marginal triggering potentials in the trigger circuit, is nullified by application of an over-riding trigger voltage of reversely-poled nontriggering character from source H via the transistor to the accumulator circuit.

A preferred embodiment of the circuit is depicted in FIGURE 2 wherein the source of the primary flame-sensed signals is shown as the usual flame-rod electrode 10 projected into the monitored flame with the base 11 of the burner utilized as the other electrode.

High voltage at about 350 volts is supplied by a transformer winding 13 to said electrodes, the burner base being connected via conductor 12 to one terminal of said winding and the probe 10 connecting via conductor 15, a protective resistor 16 (about 100K ohms) a capacitor 17 (about .22 mfd.) and conductors 18 and 18A returning to the remaining terminal of the transformer winding.

When the gap across the flame-sensing electrodes 10 and 11 is bridged by a flame of suitable quality, a substantially unidirectional current will be passed, usually rangng between 10 and 50 microamperes, this flame signal energy being applied via limiting resistors 19 and 20 (about 1 megohm respectively) to the terminals a and b designating for reference purposes the input circuit of an electron-flow device shown as a transistor TR, and comprising the emitter 25 connected to terminal a and the base 26 connecting via conductors 29, 29A to terminal b.

The flame-passed current is poled to act as reverse bias on the transistor input circuit causing the device to be nonconductive, so that no effective current flows in its output circuit regarded as the collector 27 and emitter 25 respectively connecting via conductor 28 to terminal c and via conductors 29, 29A to terminal b', said terminals designating the output circuit being employed merely for convenience to facilitate reference, it being noted at this point that a forward bias resistor 40 and a spike-suppressing capacitor 42 are shunted across this circuit.

Forward bias is provided by another transformer winding 30, one terminal of which connects via limiting resistor 32 (about 1K ohms) conductors 33, 33A to one terminal of a trigger signal accumulating means in the form of a capacitor 34 (about 35 mfd.) having its other terminal connected via conductors 36A, 35B, terminal *e* to conductor 35 and transistor output terminal *c*, the remaining terminal of transformer winding 30 being connected via conductor 36, junction 37, conductor 37A, junction 64, to the cathode of a half-wave rectifier diode 39, the anode 39A of which connects via conductor 38 to the transistor input at terminal *a* including the emitter 25, and dropping via base 26 to conductor 29A to which the lower end of the bias resistor 40 connects so that the upper end thereof, connecting with the collector 27, renders the latter at a lower potential than the base in the NPN configuration shown, capacitor 44 serving as a blocking means in this connection.

The bias across the transistor input circuit supplied as last described via conductor 38 tends to throw the device into the conductive state but is opposed and prevented from doing so by the reverse bias supplied by the flame signal energy acting as at terminals *a* and *b*, as previously described.

The transformer winding 30 also supplies triggering voltage for the load relay circuit and the trigger signal accumulating capacitor 34 by connection from one side of said winding via the path 32, 33, 33A previously described, and the conductor 36 to common junction 64 connecting with the anode 65A of another rectifying diode 65, the cathode of which connects via conductor 66 and a limiting resistor 67 (about 5.6K ohms) and conductors 35, 35B, 36A to the remaining terminal of the accumulating capacitor 34, thus applying a charge thereto which is cumulative for the purpose of maintaining a constant triggering voltage on the trigger circuit for the load relay gating SCR device as long as the transistor remains nonconductive. It may be observed at this juncture that the trigger signal capacitor 34 is shunted by a diode 68 across trigger circuit terminals 59, 60 in such polarity as to protect the capacitor against excessive reverse over-ride voltage which is purposely applied to the capacitor by the transistor when it goes conductive in response to flame failure and has discharged the normal positive triggering charge, as will be further explained hereafter.

The voltage supplied by transformer winding 30 is limited by a clipping means in the form of a pair of Zener diodes 70A, 70B connected back to back at 71 and shunted across the winding at junction 37 and conductor 33, and is out of phase with winding 52.

At the master control or relay side of the system, the load relay winding 50 is connected by conductor 51 to one terminal of a third transformer winding 52 whose remaining terminal connects via conductor 53, terminal 59 and conductor 55 to the cathode 56 of a triggerable electron flow or gating device such as a silicon controlled rectifier, designated SCR (e.g., General Electric C106G2 or equivalent), the anode 57 of which connects via conductor 61 to complete the relay energizing circuit to the remaining terminal of transformer winding 50, it being understood that the switching contacts of this relay will be connected in a desired master control circuit (not detailed) corresponding to the fuel-valve shut-off means indicated in the diagram of FIGURE 1.

The character of the SCR gating device is such that the cathode-anode path 56–57 therof tends to become and remain non-conductive responsive to cessation of current flow therethrough until such time as a proper triggering potential is applied to the trigger circuit thereof comprising the trigger electrode 58 and cathode 56 and connections thereof to the source of triggering voltage, the resultant gating conductivity persisting so long as the trigger potential acts, or in the absence of continuing trigger potential, once triggered, until the cessation of the gated current flow. It will therefore be seen that if a single adequate triggering signal is applied to the device, it will continue to conduct or gate current to energize the load relay until such time as such current flow is interrupted without application of any further triggering potential. Since the transformer winding 52 supplies alternating current as the energizing power for the load relay, and the gating anode-cathode path for such current is unidirectional, the SCR tends to be self-quenching at the end of each negative-going phase of each alternating current cycle, and will shut itself off or become non-conductive automatically within one half-cycle of the power line frequency, once the trigger signal energy is removed, it being observed that transformer winding 30 is out of phase with winding 52 to assure this action.

The output circuit of the flame-controlled transistor device connects with the triggering circuit in a way to divert and remove the triggering charge from the accumulating means 34 whereby to prevent further triggering of the SCR gating device so long as the transistor is caused, by absence of the monitored flame signal, to render the transistor conductive, the accumulating or triggering capacitor means 34, in addition to being connected to the charging circuit means 30, 65 via conductors 33 and 35, being also connected to provide a diversion path 36A, 35B, 35 to collector 27; and 33A, 33, 30, 36, 64, 39, 38 to the emitter 25 and common base 26, in consequence of which the trigger capacitor 34 will be discharged by the transistor instantly upon removal therefrom of the flame-signal bias by flame failure or related conditions calling for drop out of the relay, as for instance in case the flame-sensing probes become short-circuited to ground or the burner base, or leakage paths devleop owing to soot accumulation on the probe, all of which conditions can cause high alternating voltage to be applied directly to conductors 15 and 18A.

Such voltages, however, are limited by the protective high resistances 16 and 19 in any event, and by-passed from the transistor input by the capacitor 17 to the extent of the current passing the 100,000 ohm resistor 16 sufficiently to prevent any reverse or over-riding bias effects which might interefere with conduction of the transistor for the purpose of extracting, dissipating and diverting the triggering charge on, and continually being delivered to, the trigger capacitor 34.

In order to sharpen the response of the transistor in changing to the conductive state, and to suppress spikes and transients, additional capacitors 42 and 43 (about .025 and .05 mfd. respectively) are shunted across the input and output circuits.

By reason of the half-wave rectification of the triggering and forward bias voltages in alternate half-cycles of each line cycle, it will be seen that during the positive-going half cycle a positive triggering charge is placed upon the trigger capacitor 34, and when the flame is absent, this charge is removed by the diverting transistor circuit in the next ensuing negative-going half cycle. Moreover, the applied voltages are contrived so that during such negative-going half cycles a reversely-poled over-ride voltage of about .6 volt is left on capacitor 34 to foreclose all possibility of firing or triggering from residual charges and spurious charging voltages appearing possibly in the succeeding positive half-cycles during the drop-out or failed condition.

In order to achieve such an operation and control of the trigger circuit, it is necessary that the capacitor 34 be of the electrolytic type, since other types of dielectric would necessitate an enormous size for a capacitor of the capacity required; and while application of reverse voltages to an electrolytic capacitor are not normal or recommended, it is found that guarding the capacitor 34 with suitable voltage regulation and protective by-passing means, such as the diode 68, operative particularly in the direction of reverse polarity and conduction, a good quality electrolytic capacitor 34 of cemmerical grade can be dependably subjected to continuously applied reverse voltages of the order named without damage, and it is accordingly possible to utilize a very small capacitor at the working voltage required so that the over-all size of the control units can be kept quite small, for example, well within a volume of 1.5 cubic inches as the total size of each control unit less the power supply and relay, the flame sensing probes being of course extraneous burner equipment.

We claim:

1. Flame monitoring apparatus capable of directly controlling a load relay by flame signal current wherein the load relay is continually energized by power gated thereto responsive to triggering of a triggerable gating device with trigger signal energy supplied to a trigger signal accumulating means connecting with a trigger circuit for said gating device; wherein an electron-flow device having conductive and nonconductive states is connected with said accumulating means for operation to divert trigger signal energy from the accumulating means in said conductive state thereof sufficiently to prevent triggering of the gating device whereby to drop out the load relay; wherein said flame signal current is connected to act upon the electron-flow device to maintain the same in the nonconductive state so long as the monitored flame continues to supply flame signal current, said electron flow device changing from the nonconductive to the conductive state responsive to cessation of flame signal current whereby to stop gating of power to the load relay and cause the latter to drop out as aforesaid.

2. Apparatus according to claim 1 wherein said gating device is of the class of a silicon controlled relay having an anode, a cathode and a trigger electrode and the gated power is passed by circuit connections to the load relay by a path from a power source through said anode and cathode in a triggered conductive state thereof, and said trigger electrode is connected in a triggering circuit with said accumulating means for gating operation as aforesaid.

3. Apparatus according to claim 2 wherein said power source is alternating and said anode-cathode path remains conductive only in the positive-going phase of each cycle of the alternating current passed to the load relay and becomes nonconductive in the ensuing negative-going phase of such cycle to extinguish conductivity of the device automatically; and said trigger signal accumulating means normally supplies triggering energy to the trigger circuit sufficiently to maintain the gating device in conductive condition from one alternating current cycle to the next whereby to hold the load relay in a sustained condition of energization so long as trigger signal energy is supplied by said accumulating means.

4. Apparatus according to claim 1 wherein said electron-flow device is of the solid-state class in the form of a transistor having input and output electrodes respectively connecting in input and output control circuits; wherein said transistor electrodes are biased for forward conduction to render said output circuit conductive and said input circuit is connected with said flame signal current source to be reversely biased thereby during continuance of the monitored flame and render said output circuit nonconductive; wherein said trigger signal accumulating means is connected with said output circuit for operation such that in the conductive state thereof the trigger signal energy in the accumulating means is diverted therefrom sufficiently to prevent triggering of the gating device as aforesaid.

5. Flame monitoring apparatus according to claim 4 wherein the biasing of the electrodes of the transistor is such that in said conductive state thereof an over-ride trigger voltage of reverse polarity sufficient to prevent triggering of the gating device is applied to said accumulating means as a cofunction of said trigger-signal energy-diverting action.

6. Apparatus according to claim 4 wherein said accumulating means comprises a capacitor of the electrolytic class connecting with a source of triggering voltage of given polarity to accumulate therefrom a triggering charge capable of firing the gating device to its gating state; wherein said over-ride trigger voltage is connected with said capacitor to place a charge thereon of a polarity opposite said given polarity and effective to inhibit triggering of the gating device.

7. Apparatus according to claim 6 wherein protective current and voltage-limiting means are connected with said source of triggering voltage and a source of voltage for biasing the transistor electrodes as aforesaid whereby to limit the voltages and current of the charges of either polarity applied to the accumulating-means capacitor as aforesaid.

8. Flame monitoring apparatus as set forth in claim 1 wherein said gating device is a silicon controlled relay having a triggering circuit and a gating circuit connecting with a source of energizing power and said load relay to energize the latter responsive to application of trigger signal energy to said triggering circuit; wherein said electron-flow device is a transistor having control electrodes respectively connecting in an input circuit and an output circuit; wherein biasing voltages applied to said control electrodes render said output circuit conductive or nonconductive depending on the polarity of such biasing voltages; wherein said accumulating means is connected with said output circuit and the latter is effective in the conductive state thereof to discharge the triggering energy from the accumulating means and thereby prevent triggering of the gating device; wherein said input circuit is connected with said source of flame signal current such that the latter applies a bias of such polarity as to render said output circuit nonconductive so long as the monitored flame continues to supply flame signal current, thereby permitting triggering signal energy in the accumulating means to trigger the gating device so long as said output circuit remains nonconductive.

9. Apparatus according to claim 8 further characterized in that bias is connected with said output circuit such that in the conductive state of the latter a charging current of a polarity opposite from that of the trigger signal energy acts through said accumulating means upon said trigger circuit to oppose triggering of the gating device.

10. A flame monitoring circuit comprising, in combination with a load relay and a source of flame-passed flame signal current; a source of power for energizing said relay; a solid-state current gating device having a trigger electrode and anode-cathode current gating electrodes connecting with said power source and relay for energization of the latter in a conductive condition thereof responsive to application to the trigger electrode of a triggering potential; a source of triggering potential and charge accumulating means connecting therewith and with said trigger electrode to apply to the latter a triggering potential for rendering said gating electrodes conductive to energize the load relay so long as the triggering potential continues to act on the trigger electrode; and a solid-state electron-flow device having an input electrode and output electrodes responsive to bias connected therewith such that a first bias condition acting on said input electrode results in a conductive state of the output electrodes, and a second bias condition acting on said input electrode results in a nonconductive state of the output electrodes; circuit means connecting said output electrodes with said accumulating means and affording in the conductive state of said electrodes a charge-diverting and dissipating path for triggering energy in the accumulating means and effective to prevent application of triggering potential to said trigger circuit; and circuit means connecting with said source of flame signal current and said input electrode of the electron-flow device to produce said first bias condition in which the output electrodes are in the nonconductive state whereby to render said charge-diverting and dissipating path therethrough effectively closed with respect to the accumulating means, so long as the flame-signal bias acts as aforesaid.

11. Flame monitoring apparatus comprising a relay, a source of alternating voltage; triggerable bi-stable rectifying means having a conductive and a nonconductive state and triggerable to the conductive state by application thereto of a trigger potential of a certain polarity which state it will maintain so long as the current conducted thereby continues of a given polarity, said bi-stable means being connected with said voltage source and relay for triggering to pulse the relay by current conducted thereby in the triggered state in each alternating half-cycle of said given polarity and being self-quenching on cessation of flow of current of such polarity; a course of trigger pulses energized from said alternating voltage source in each half-cycle thereof which is of said certain polarity; circuit means connected to receive said triggering pulses and apply the same to said bi-stable means to trigger the latter to its conductive state repetitiously at half-cycle intervals and maintain the relay in an effectively continuously energized state; a potential-controlled monostable switching means having conductive and nonconductive states dependently upon application thereto of a control signal of requisite polarity and having connection with said receiving means for action in its conductive state to nullify the triggering action of the trigger pulse energy received thereby; and means connecting with a source of flame-signal potential of said requisite polarity for rendering said monostable means nonconductive as a function of flame presence, whereby said relay will continue in its effectively energized state so long as the flame potential continues.

References Cited

UNITED STATES PATENTS

| | | | |
|---|---|---|---|
| 2,817,758 | 12/1957 | Westbrook | 328—6 |
| 2,832,929 | 4/1958 | Cairns et al. | 328—6 |
| 3,091,724 | 5/1963 | Giuffrida et al. | 317—149 |
| 3,238,423 | 3/1966 | Giuffrida | 317—148.5 |
| 3,267,300 | 8/1966 | Plambeck | 317—149 XR |
| 3,348,104 | 10/1967 | Zielinski et al. | 317—148.5 XR |

JOHN F. COUCH, *Primary Examiner.*

W. M. SHOOP, JR., *Assistant Examiner.*

U.S. Cl. X.R.

307—117; 328—6; 340—228